(12) United States Patent
Deasy et al.

(10) Patent No.: US 7,253,722 B2
(45) Date of Patent: Aug. 7, 2007

(54) SENSOR ALIGNMENT DETECTION METHOD FOR AN INFRARED BLIND-ZONE SENSING SYSTEM

(75) Inventors: Kevin M. Deasy, Noblesville, IN (US); Adil Ansari, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 247 days.

(21) Appl. No.: 11/149,820

(22) Filed: Jun. 9, 2005

(65) Prior Publication Data

US 2007/0008092 A1    Jan. 11, 2007

(51) Int. Cl.
*B60Q 1/00* (2006.01)
*G01S 7/40* (2006.01)

(52) U.S. Cl. .................. 340/436; 340/425.5; 340/903; 340/686.2; 180/167; 342/165; 342/173; 342/174

(58) Field of Classification Search ................. 340/436
See application file for complete search history.

(56) References Cited

U.S. PATENT DOCUMENTS

| | | | | |
|---|---|---|---|---|
| 6,087,995 | A * | 7/2000 | Grace et al. ................. | 343/703 |
| 6,556,166 | B1 * | 4/2003 | Searcy et al. ............... | 342/165 |
| 6,753,766 | B2 * | 6/2004 | Patchell ...................... | 340/436 |
| 6,933,883 | B2 * | 8/2005 | Isaji ........................... | 342/174 |
| 2002/0105456 | A1 * | 8/2002 | Isaji ........................... | 342/165 |
| 2002/0126002 | A1 | 9/2002 | Patchell | |
| 2004/0066325 | A1 | 4/2004 | Zoratti et al. | |
| 2005/0062615 | A1 * | 3/2005 | Braeuchle et al. .......... | 340/903 |
| 2006/0072223 | A1 | 4/2006 | LaFranc et al. | |

FOREIGN PATENT DOCUMENTS

WO    WO2004099742    11/2004

OTHER PUBLICATIONS

EP Search Report dated Sep. 19, 2006.

\* cited by examiner

*Primary Examiner*—Donnie L. Crosland
(74) *Attorney, Agent, or Firm*—Jimmy L. Funke

(57) ABSTRACT

A diagnostic method for a blind-zone sensing system including leading and trailing passive IR sensors periodically determines a separation distance between coverage areas of the leading and trailing sensors to diagnose sensor alignment. Signals produced by the leading and trailing sensors are sampled and stored over a defined interval of time for processing. A condition in which the sensor coverage areas abruptly encounter a stationary region of cooler temperature is detected when corresponding signal deflections are identified. The elapsed time between the identified signal deflections is measured and used along with an accurate measure of the vehicle speed to compute the separation distance between coverage areas of the leading and trailing sensors.

5 Claims, 3 Drawing Sheets

SENSOR ALIGNMENT DETECTION METHOD FOR AN INFRARED BLIND-ZONE SENSING SYSTEM

TECHNICAL FIELD

The present invention relates to infrared (IR) blind-zone sensing systems, and more particularly to a method of detecting sensor alignment.

BACKGROUND OF THE INVENTION

A potentially advantageous vehicular blind-zone detection system utilizes two or more passive IR sensors spaced along at least the driver side of the vehicle. The sensors are aimed at a lane adjacent the vehicle and respond to the temperature of objects (i.e., radiant energy or infrared radiation) in the respective coverage areas. As the vehicle is driven, the trailing sensor will respond to the same objects that the leading sensor responded to moments earlier; that is, the leading and trailing sensors will be responsive to the same stationary target area. The sensor outputs are therefore very similar when the adjacent lane is empty, but differ significantly when an object entering the blind-zone is registered by just one of the sensors—the trailing sensor, in the case of an over-taking vehicle. In operation, the sensor outputs can be monitored as the vehicle is being driven and used to produce a driver warning if lane changing is attempted or signaled when an object has been detected in the adjacent lane. Such a system is described, for example, in the Patent Publication No. 2002/0126002 A1, incorporated by reference herein.

As described in the aforementioned patent publication, the sensors must be aligned very carefully to ensure that they respond to the same stationary target area such as the vehicle blind-zone. When the sensors are properly aligned, there is a known and fixed separation distance between the coverage areas of the leading and trailing sensors so that the time delay between outputs produced by the leading and trailing sensors may be accurately determined based on the known separation distance and the vehicle speed. Although the vehicle speed can be measured very accurately using wheel speeds for example, proper alignment of the passive IR sensors cannot be easily verified, and the alignment of a given sensor could change for a variety of reasons depending on how it is mounted and whether the vehicle sustains even minor damage from a collision, for example.

SUMMARY OF THE INVENTION

The present invention is directed to an improved method of detecting and verifying proper alignment of leading and trailing passive IR sensors in a blind-zone sensing system by periodically determining a separation distance between coverage areas of the leading and trailing sensors. Signals produced by the leading and trailing sensors are sampled and stored over a defined interval of time for processing. The processing identifies sensor signal deflections that occur when the sensor coverage areas abruptly encounter a stationary region of cooler temperature such as a shadow from an overpass or bridge or a border between a grass median strip and asphalt pavement. When such a stationary region is detected, the elapsed time between the identified signal deflections is measured and used along with an accurate measure of the vehicle speed to compute the separation distance between coverage areas of the leading and trailing sensors.

DESCRIPTION OF THE PREFERRED EMBODIMENT

Figure 1:
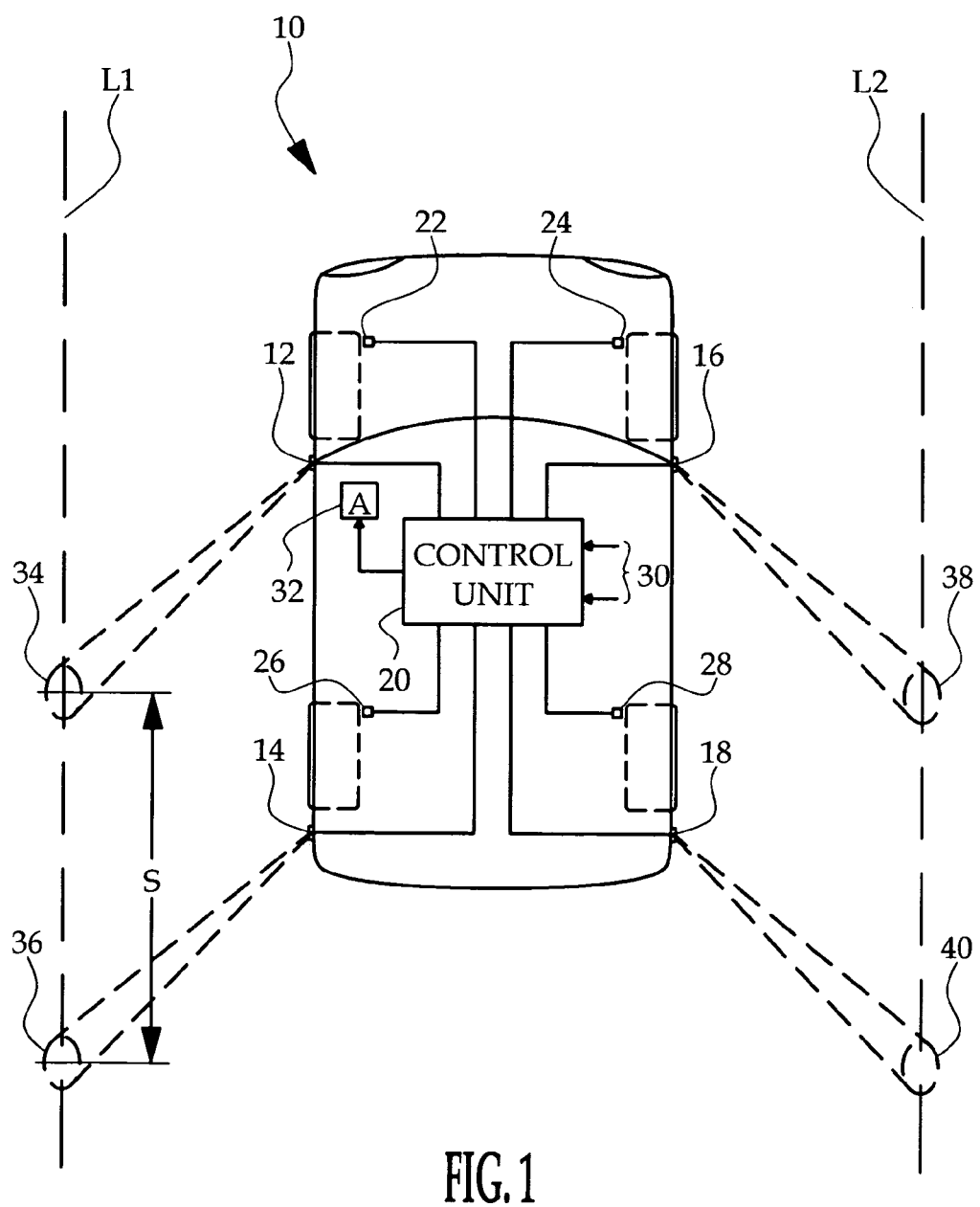
FIG. 1 is a diagram of a vehicle equipped with a blind-zone sensing system including leading and trailing passive IR sensors and a microprocessor-based control unit.

Referring to FIG. 1, the reference numeral 10 generally designates a motor vehicle equipped with a blind-zone sensing system of the kind generally described in the aforementioned Patent Publication No. 2002/0126002 A1. In the illustrated embodiment, the sensing system includes two passive IR sensors on each side of the vehicle 10. The sensors 12 and 14 are respectively mounted in leading and trailing positions on the driver side, while the sensors 16 and 18 are respectively mounted in leading and trailing positions on the passenger side. The leading position sensors 12 and 16 maybe mounted in left and right outside rearview mirrors, for example, and the trailing position sensors 14 and 18 may be mounted in left and right side markers, or in a rear bumper, for example. The sensors 12-18 provide input signals to a microprocessor-based control unit 20, which processes the signals to detect the presence of a moving object such as another vehicle in adjacent roadway lanes L1 or L2. The control unit 20 also receives inputs from one or more wheel speed sensors 22, 24, 26, 28 and inputs 30 pertaining to parameters such as ambient light level and sensor temperature, and lane change indications such as turn signal actuation. The system also includes a warning actuator (A) 32 that is selectively activated by the control unit 20 to appropriately warn the driver of the presence of a moving object in an adjacent lane.

The sensors 12-18 are mounted on vehicle 10 so that leading and trailing position sensors on each side of the vehicle are focused on respective stationary target areas alongside the vehicle 10. In a typical implementation, the sensors 12, 14 on the left or driver side of vehicle 10 will be aligned to focus on the center of a roadway lane L1 to the left-rear of vehicle 10, and the sensors 16, 18 on the right or passenger side of vehicle 10 will be aligned to focus on the center of a roadway lane L2 to the right-rear of vehicle 10. The ellipses 34, 36, 38 and 40 designate the respective coverage areas of the sensors 12, 14, 16 and 18. Referring to the driver side of vehicle 10, the sensors 12 and 14 will be accurately aligned when the coverage areas 34 and 36 both lie on the center of lane L1 and are spaced by a longitudinal separation distance S. In operation of the blind-zone sensing system, this separation distance S can be used in conjunction with the vehicle speed VS (the average of the sensed wheel speeds, for example) to compute the time delay TD between detection of an object by the leading sensor 12 and the trailing sensor 14. The same is true of the right or passenger side sensors 16 and 18. As described in the aforementioned Patent Publication No. 2002/0126002 A1, the computed time delay TD can be applied to the signal produced by the leading sensor 12 or 16 so that the difference between the trailing and delayed leading signals on a given side of the vehicle 10 can be used to detect the presence of a moving object such as a passing vehicle.

When the sensors 12-18 are properly aligned, the above-described system effectively defects moving objects such as other vehicles in adjacent lanes, and can be used to activate the warning actuator 32 at least when the driver of vehicle 10 indicates an intention to change lanes inappropriately. However, proper alignment of the IR sensors 12-18 cannot be easily verified, particularly because they are passive devices, and the alignment of a given sensor 12-18 could change for a variety of reasons depending on how it is mounted and whether the vehicle 10 is damaged in a collision, for example. If one or more of the sensors 12-18 are misaligned, the coverage area separation distance S changes from the predetermined setting, which introduces errors into the computation of delay time TD and corresponding object detection errors.

The method of the present invention overcomes the above-described problem by processing the signals produced by the sensors 12-18 during normal operation of the vehicle 10 to actually detect the coverage area separation distance S on both driver and passenger sides. In general, this is accomplished by identifying sensor signal deflections indicative of the passage of the coverage areas 34 and 36 (or 38 and 40) through a region of cooler temperature caused by a stationary object such as an overpass (or its shadow) or a border between a grass median strip and asphalt pavement. When such a stationary region is detected, the sensor signal deflections produced by the respective leading and trailing sensors are identified, and the time difference $\Delta T$ between the identified deflections is measured. This measured time difference $\Delta T$ is multiplied by the vehicle speed VS to compute the coverage area separation distance S. If the computed separation distance S is within a window of acceptability, it is recorded and used for moving object detection as described above; otherwise, the controller 20 can issue a diagnostic warning via actuator 32, signaling the driver that sensor re-alignment is needed.

Figure 2:
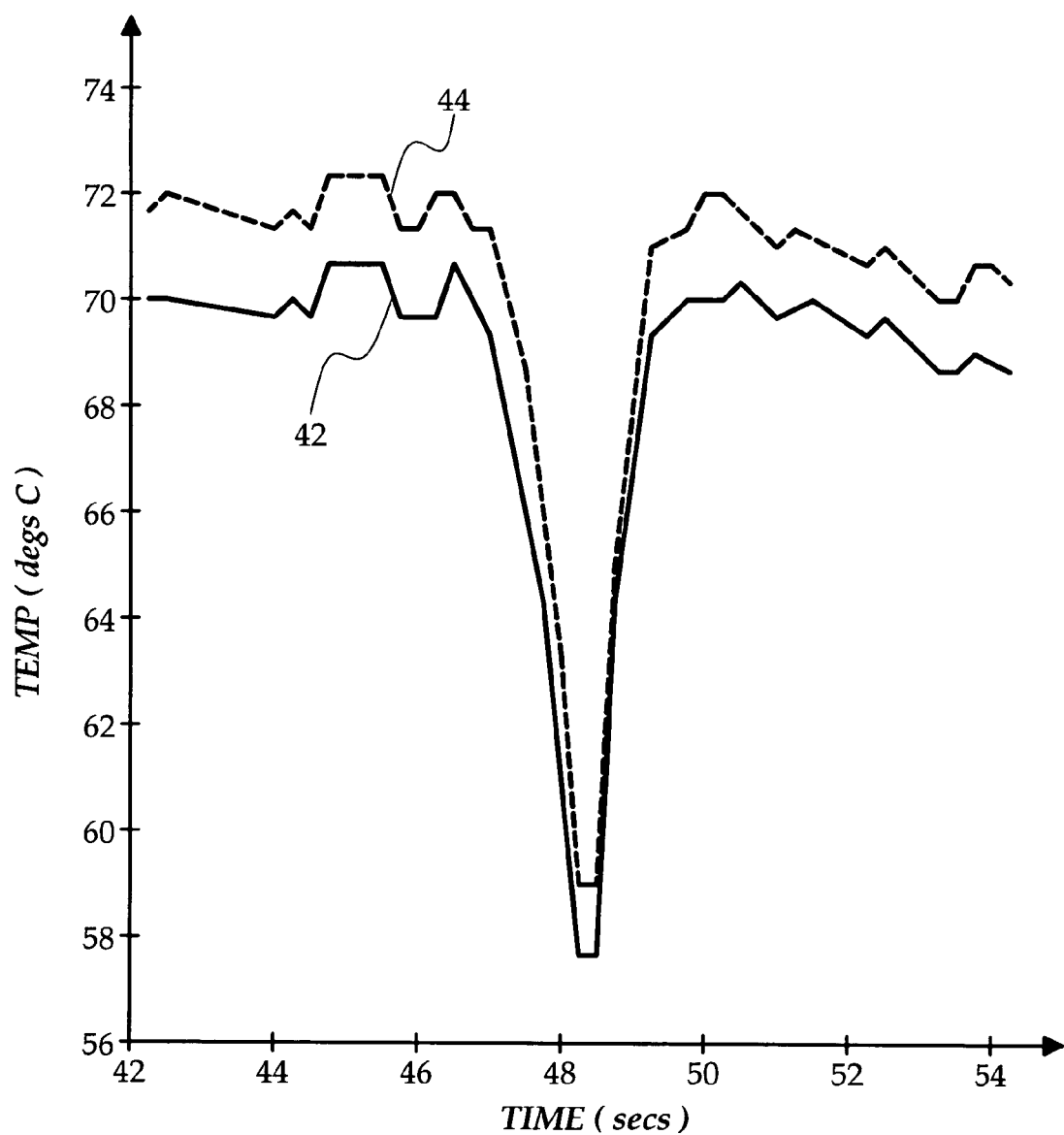
FIG. 2 is graphically depicts signals produced by the driver side leading and trailing sensors of FIG. 1 as they respond to a stationary region of cooler temperature created by a shadow from an overpass.

The solid and dashed traces 42 and 44 of FIG. 2 respectively depict successive samples of the signals produced by the leading and trailing sensors 12 and 14 when the corresponding coverage areas 34 and 36 pass through a stationary region of cooler temperature caused by a shadow from an overpass. The negative going signal deflections, with the signal 42 of the leading sensor 12 deflecting before the signal 44 of the trailing sensor 14, positively identify such a stationary region. The control unit 20 buffers successive samples of the sensor signals, and can easily identify the maximum negative-going deflections in each signal and determine the time difference $\Delta T$ based the number of samples separating the two deflections.

Figure 3:
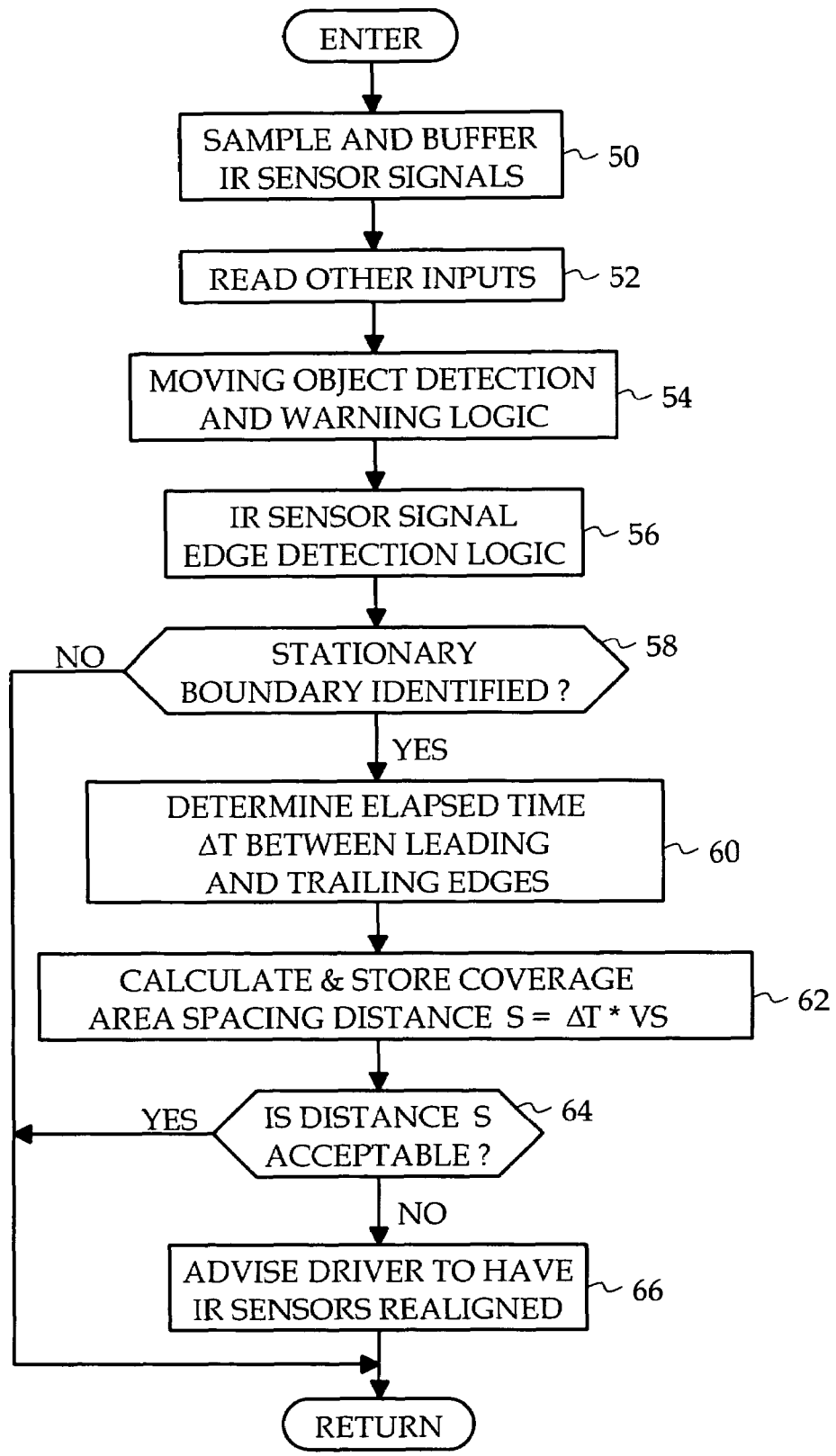
FIG. 3 is a flow diagram representative of a software routine executed by the control unit of FIG. 1 for carrying out the method of the present invention.

Referring to FIG. 3, the flow diagram blocks 50-66 represent a software routine periodically executed by the control unit 20 according to this invention. The blocks 50 and 52 sample the various input signals mentioned above in respect to FIG. 1 and buffer the IR sensor signals. The block 54 carries out a routine for detecting the presence of moving objects in the stationary sensing areas as described above and for issuing a driver warning when appropriate. The block 56 monitors the buffered leading and trailing sensor signals for a given side of the vehicle 10 to identify negative-going signal deflections indicative of a stationary region of cooler temperature as described above in respect to FIG. 2. Block 58 determines if block 56 has identified the crossing of such a region. If not, the remainder of the routine is skipped; if so, the blocks 60-66 are executed to determine the coverage zone separation distance S and to issue a driver warning if appropriate. Block 60 determines the time difference $\Delta T$ between the identified signal deflections, and block 62 calculates and stores the corresponding coverage zone separation distance S according to the product of the time difference $\Delta T$ and the current vehicle speed VS. The block 64 determines if the calculated separation distance S is within a range or window of acceptable values—i.e., if the deviation of the separation distance S from a predetermined separation distance is less than a reference value. If so, the remainder of the routine is skipped, and successive executions of the moving object detection routine (block 54) are carried out using the newly stored separation distance S. If the calculated separation distance S is outside the range of acceptable values, the block 66 is executed to issue a diagnostic warning via actuator 32, signaling the driver that re-alignment of the IR sensors 12-18 is needed.

In summary, the method of the present invention advantageously addresses a practical concern associated with IR-based blind-zone sensing systems. The method confirms and periodically verifies proper sensor alignment, and adaptively adjusts the coverage zone separation distance S when it falls within an acceptable range for improved detection of moving objects. While the present invention has been described with respect to the illustrated embodiment, it is recognized that numerous modifications and variations in addition to those mentioned herein will occur to those skilled in the art. For example, the number of IR sensors may be different than depicted, the vehicle speed may be determined in a different way, and so forth. Accordingly, it is intended that the invention not be limited to the disclosed embodiment, but that it have the full scope permitted by the language of the following claims.

The invention claimed is:

1. An alignment detection method for a sensing system of a motor vehicle, the sensing system having first and second passive sensors mounted on the vehicle and aligned to detect radiant energy in first and second coverage areas laterally spaced from the vehicle and longitudinally separated by a predetermined distance for purposes of sensing an object of interest, the alignment detection method comprising the steps of:

sampling and storing first and second signals produced by said first and second sensors;

monitoring the sampled signals to identify deflections of said first and second signals that are indicative of a change in detected radiant energy caused by a stationary object or region;

determining a time difference between occurrences of the identified deflections of said first signal and second signals;

calculating a distance using said determined time difference and a measured speed of said vehicle; and comparing said calculated distance to said predetermined distance to determine if said first and second passive sensors are properly aligned.

2. The method of claim 1, including the step of:

calculating said distance according to a product of the determined time difference and the measured speed of said vehicle.

3. The method of claim 1, including the step of:

determining that said first and second passive sensors are properly aligned when a deviation of said calculated distance from said predetermined distance is less than a reference value.

4. The method of claim 3, including the step of:

using said calculated distance for purposes of sensing said object of interest.

5. The method of claim 1, including the step of:

determining that said first and second passive sensors are mis-aligned when a deviation of said calculated distance from said predetermined distance is greater than a reference value.

* * * * *